United States Patent
Iellimo et al.

(10) Patent No.: US 12,157,633 B2
(45) Date of Patent: *Dec. 3, 2024

(54) PALLET SPACING SYSTEM AND METHOD

(71) Applicant: FRAZIER INDUSTRIAL COMPANY, Long Valley, NJ (US)

(72) Inventors: Domenick Iellimo, Forked River, NJ (US); Emery Louis (Jim) Kocsis, Fort Worth, TX (US)

(73) Assignee: Frazier Industrial Company, Long Valley, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,767

(22) Filed: Nov. 3, 2023

(65) Prior Publication Data

US 2024/0059490 A1 Feb. 22, 2024

Related U.S. Application Data

(63) Continuation of application No. 17/499,240, filed on Oct. 12, 2021, now Pat. No. 11,845,609.

(51) Int. Cl.
*B65G 1/04* (2006.01)

(52) U.S. Cl.
CPC .... *B65G 1/0492* (2013.01); *B65G 2201/0267* (2013.01); *B65G 2203/0283* (2013.01); *B65G 2203/042* (2013.01); *B65G 2203/044* (2013.01)

(58) Field of Classification Search
None
See application file for complete search history.

(56) References Cited

U.S. PATENT DOCUMENTS

| | | |
|---|---|---|
| 9,315,320 B2 | 4/2016 | Kawano |
| 10,351,344 B2 | 7/2019 | Gebhardt |
| 10,589,929 B2 | 3/2020 | Iellimo |
| 2008/0131241 A1 | 6/2008 | King |
| 2015/0178673 A1 | 6/2015 | Penneman |
| 2019/0291951 A1 | 9/2019 | Iellimo |
| 2021/0354922 A1 | 11/2021 | Gravelle |
| 2022/0017305 A1 | 1/2022 | Larsson |

OTHER PUBLICATIONS

Pallet mole "what is it" from www.interlakemecalux.com (of record in parent). (Year: 2017).
Pallet mole advantages, from www.interlakemecalux.com (of record in parent). (Year: 2017).
Pallet Mole video from Youtube, 2018, https://www.youtube.com/watch?v=-ebNJXxTFeE (Year: 2018).

*Primary Examiner* — Mark C Hageman
(74) *Attorney, Agent, or Firm* — Dilworth & Barrese, LLP

(57) ABSTRACT

A system and method for operating robotic pallet transportation carts and providing uniform spacing between pallets of goods, to improve the vertical alignment of the gaps between the pallets of a multilevel commercial warehouse rack. Indicators are positioned along a storage lane, such as on side walls of cart support rail structures, on the left and/or right sides with respect to the pallet transportation cart. The cart has one or more sensors (optical, magnetic and otherwise), such as on a side of the cart to detect the indicators on the side of the lane. The cart is programmed to count the indicators and lower the pallet of goods after sensing a selected indicator number. By spacing the indicators an appropriate distance apart, the pallets can be arranged to have vertically aligned gaps, even if there are minor variations in the length of pallets of goods.

23 Claims, 6 Drawing Sheets

PALLET SPACING SYSTEM AND METHOD

This application claims priority as a continuation of Ser. No. 17/499,240, filed Oct. 12, 2021, the contents of which are incorporated herein by reference.

BACKGROUND

The invention relates generally to a system and method for arranging pallets of goods on a warehouse storage rack in a more desirable configuration, and more particularly to a system and method for operating a pallet transportation cart to arrange the pallets of a multi-level warehouse rack with a vertically aligned gap therebetween.

Storage systems are used in warehouses, retail stores, cold storage areas and other storage facilities to store containers of goods. Certain storage systems employ extensive multi-story storage rack systems, often called deep lane high-density storage systems, to store large quantities of a variety of different products. These products are typically constrained onto pallets by various means, such as stretch or shrink wrapping. These rack systems often employ four, five or more vertically aligned levels of storage rack bays, each of which can be many pallets deep. Some systems can be 10, 20, 30 or more pallets deep. Due to the density of the storage area and the limited sight lines, it can be time consuming and present logistical problems to load or retrieve the pallets from these high-density storage racks.

Rack systems are typically formed with vertical columns, which support horizontal rails running lengthwise from the front of a storage bay row to the rear of each bay. The horizontal rails can have an upper surface for supporting pallets of goods and a lower surface for supporting the wheels of robotically automated carts for moving the pallets of goods into and out of the storage bay.

It has become common to use automated or semi-automated robotic pallet transportation carts to load and unload the pallets from these racks. These carts can have internal drive systems to move along rails that are positioned under the racks of goods. Many of these carts include a lift system on their upper surface. After the cart is positioned under a pallet, a pallet lifting platform lifts the pallet off the rack, and the cart brings the pallet to the desired location, where it can be lowered into place and/or removed with a forklift. These carts are sometimes referred to as autonomous guided vehicles (AGVs), but this is not typical, given that these carts typically only ride on rails.

The robotic carts often include one or more sensors. The sensors are often placed on the front of the carts to sense when the carts are approaching another object, such as another pallet of goods or a worker in the row. Some carts include motion sensors to determine when they are approaching a pallet already in place on the support surface. These sensors are often directed at an upward angle and sense the closest surface of the goods on the pallet, so that the cart can stop its forward progress and lower the pallet onto the pallet support surface of the rack. This helps prevent collisions, even when the goods overhang the edge of the pallets. The cart then returns to the front of the row to collect the next pallet.

It is inconvenient to arrange pallets of goods with precisely aligned spacing among the various levels of a rack. For example, the goods to be loaded into a bay might differ from pallet to pallet and have different dimensions from front-to-back. Moreover, even when the goods are identical, for example, cases of bottled water, small differences in the way the cases are secured to the pallet can lead to small differences in the front-to-back dimensions.

In certain long deep storage systems, even small differences in front-to-back dimensions, e.g. ¼ inch, can be compounded as the differences accumulate through a line of multiple pallets. For example, if the bundled goods on the farthest 10 pallets of the lowest row are ¼ inch more rearward on the pallet than the goods on the farthest 10 pallets of the second lowest row, the gap between the $10^{th}$ and the $11^{th}$ pallets of the lower row will be offset by 2.5 inches, as compared to the other row of pallets.

FIG. 2 shows a portion of a deep rack storage system 200. Storage system 200 includes a plurality of storage bay rows 220, arranged vertically, in different levels, one over the other. Each storage bay row 220 includes a pair of horizontal rails 225 extending from the front to the rear of each row 220. A plurality of pallets 230 of goods 231 rest on rails 225. A gap 232 exists between each pallet 230 of goods 231. For example, an arrow A extends down the gap between a pallet of goods 231a and 231b.

As can be seen in FIG. 2, the gaps 232 of one level are not vertically aligned with the gaps 232 of the level above or below. The gap between pallet of goods 231a extends into the top of a pallet of goods 231 in the row below. This can cause problems. For example, if a fire breaks out at a lower level 220a, smoke or hot air can take substantial time to make its way through the staggered gaps 232 and reach a fire detector positioned (not shown) above rack 200. Also, if any sprinkler system located above rack 200 is activated by a fire, it can be difficult for water to make its way to the bottom of rack 200. There are other advantages to having pallets 230 in a more precise vertical alignment and the same distance from the front and rear of each row. Also, depending on the types of goods stored on a pallet, or if a pallet is empty, conventional systems can have difficulties addressing these inconsistencies.

These and other shortcomings have persisted for many years without a satisfactory solution. Accordingly, a more satisfactory structure, system and method are needed to overcome drawbacks and deficiencies in the prior art.

SUMMARY

Generally speaking, in accordance with the invention, a system and method for operating robotic pallet transportation carts and providing uniform spacing between pallets of goods is provided, to improve the vertical alignment of the gaps between the pallets of a multilevel commercial warehouse rack system.

In one embodiment of the invention, a pair of rails run from the front of a storage bay to the rear. The pallet transportation carts travel on a lower surface of these rails and the pallets rest on an upper surface of the rails. Indicators in accordance with the invention are positioned on side walls of the rails, on the left and/or right sides with respect to the pallet transportation cart. The cart has one or more sensors (optical, magnetic and otherwise) on a side of the cart to detect the indicators on the rail side. The cart is programmed to count the indicators and lower the pallet of goods after sensing a selected indicator. By spacing the indicators an appropriate distance apart, e.g., pallet length plus desired gap, the pallets can be arranged to have vertically aligned gaps, even if there are minor variations in the length of pallets of goods. In another embodiment of the invention, the indicators can be applied at a pre-selected interval and the cart can be programmed to count indicators and determine the appropriate position to lower the pallet. It should also be noted that although side positioning is preferred, the position indicators in accordance with the invention can be positioned at any convenient location along the length of a storage bay/lane, such as under, over, or at a diagonal to where the pallet cart will pass, depending on the specific configuration of a particular rack system.

The indicators can be optical indicators, such as a hole or an anti-reflective surface, or a light colored or a reflective surface. Other indicators, such as RF chips or magnetic markers and the like can be used. In addition, bar codes, including 2D bar codes such as QR codes can be used. In one embodiment of the invention, the pallet transportation carts can be programmed to stop and lower the pallet upon sensing the indicator. In another embodiment of the invention, side walls can include two or more sets of indicators, each corresponding to a different spacing.

The carts can be programmed to carry a pallet of goods to a desired location and lower the pallet based on sensing one of the indicators on a side rail. The carts can be programmed to count the number of indicators they pass and lower the pallet when a selected indicator number is reached. Alternatively, the cart can be programmed to slow when a forward-looking sensor detects the next pallet, then lower the pallet based on the position of the side indicator. The indicator detecting side sensor is preferably located on a side of the cart. It can be located at the middle, front or rear of the cart.

Other objects, advantages and embodiments of the invention will be apparent from the specification and the drawings and the scope of the invention will be indicated in the claims.

BRIEF DESCRIPTION OF THE DRAWINGS

For a fuller understanding of the invention, reference is had to the following description, taken in connection with the accompanying drawings, in which.

The figures are for illustration only and should not be interpreted as limiting. Similar parts are assigned the same reference numerals. The proportions of the parts are illustrative and the invention can be practiced outside the scale of the drawings, which are not necessarily to scale.

DETAILED DESCRIPTION OF THE PREFERRED EMBODIMENTS

The present disclosure may be understood more readily by reference to the following detailed description of the disclosure, taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
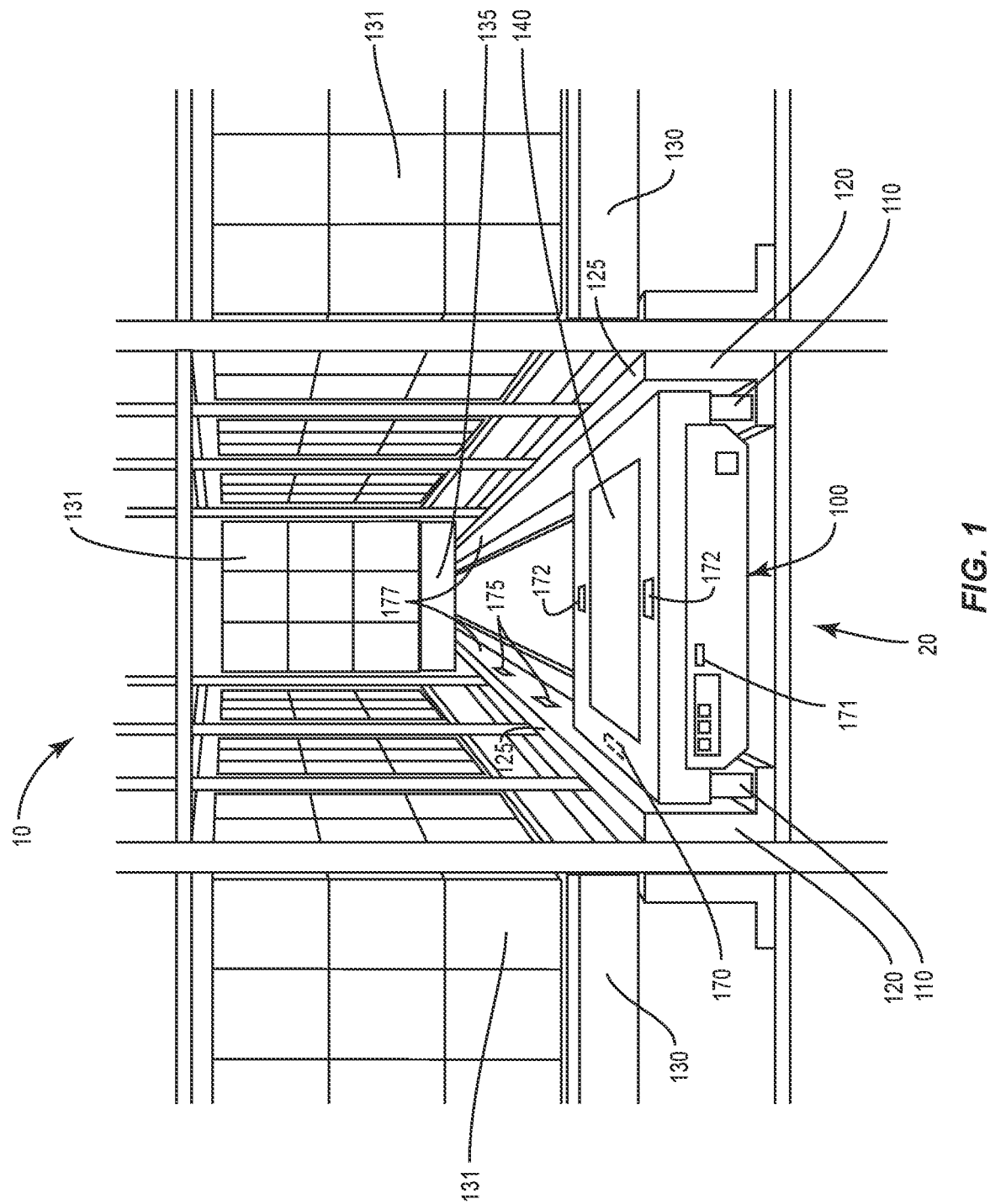
FIG. 1 is a front perspective view of a storage bay of a multilevel commercial storage rack, including an automated pallet transportation cart, in accordance with an embodiment of the invention.
Figure 1A:
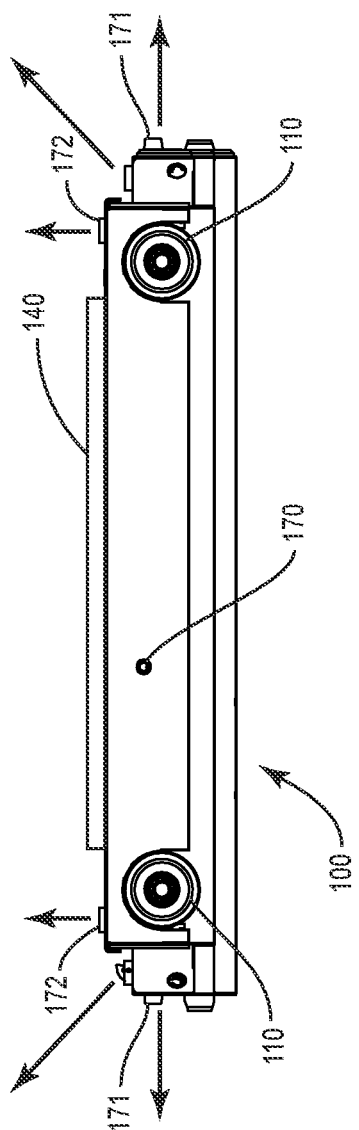
FIG. 1A is a side view of the exemplary cart of FIG. 1.
Figure 2:
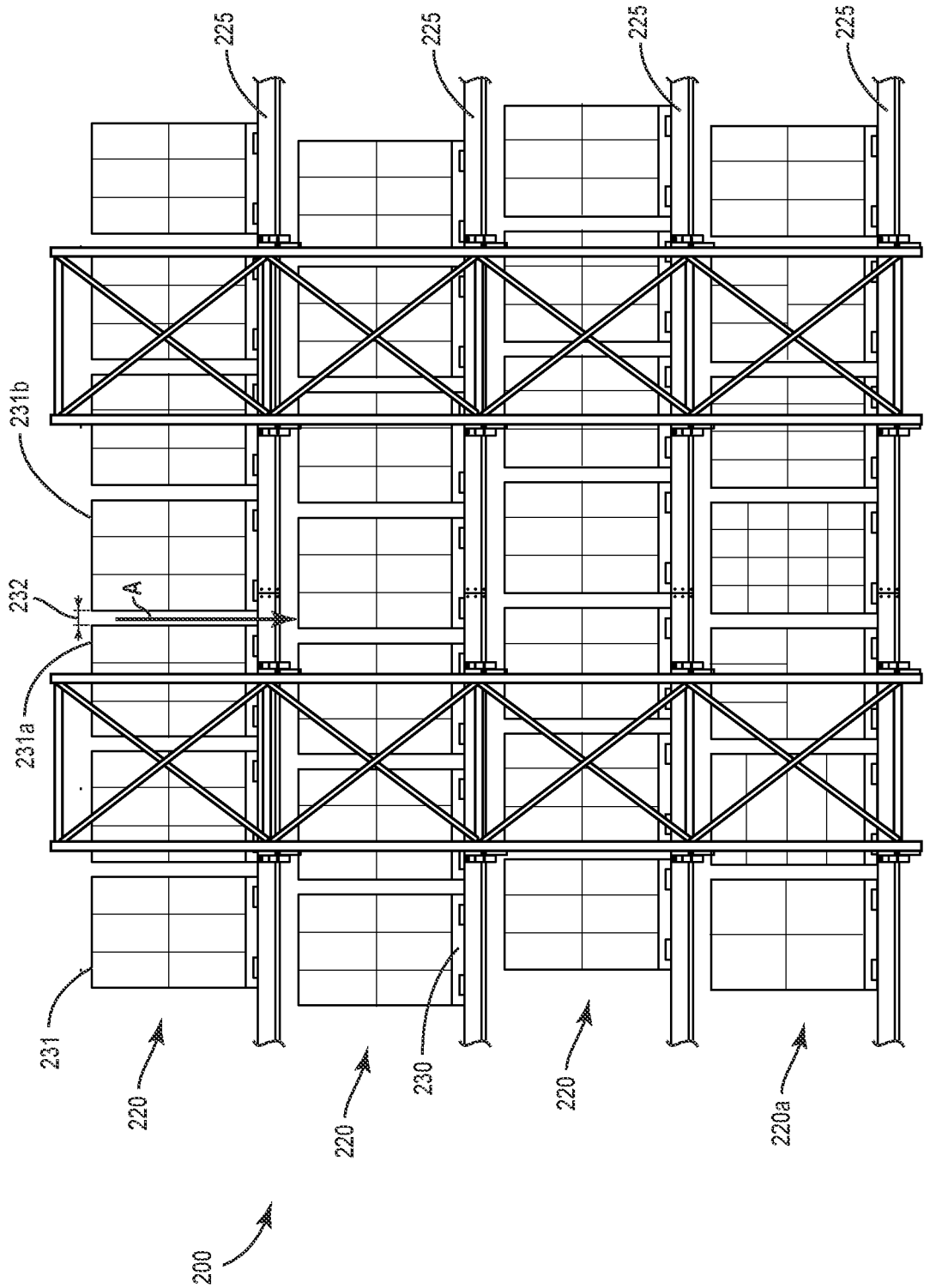
FIG. 2 is a side view of a multilevel commercial storage rack in accordance with the prior art.

A multilevel commercial storage rack system in accordance with an embodiment of the invention is shown generally as rack system 10 in FIG. 1. Rack system 10 includes a plurality of pallets 130 that are loaded with an assortment of goods 131 in a matrix of storage bays. An automated pallet transportation cart 100, also shown in FIG. 1A, is provided to transport pallets of goods into and out of a storage bay 20. Similar carts can be provided for the other storage bays or the one or more carts can be moved from bay to bay.

Cart 100 includes four wheels 110 for riding on a pair of rails 120 of storage bay 20. Cart 100 also includes a raiseable lifting platform 140 (sometimes called a deck or deck lid) for bringing pallets 130 to the desired location in rack 10 and lowering them onto a support surface 125 of rails 120. Pallets 130 can weigh well under or up to 1000 lb., 2000 lb., even up to 3000 lbs. or more when loaded with goods 131. Typically, the combined weight of pallets in a storage bay lane will exceed 4000 lbs. and can exceed many times that weight. However, under certain circumstances, the weight will be far less.

Cart 100 includes one or more sensors. The sensors can be placed on the front, rear, top, bottom and sides of cart 100. These sensors can be optical, motion, microwave, laser, etc. For example, a slowdown sensor 171 can be positioned on the front and rear of cart 100 to detect when cart 100 is approaching an object, such as a pallet of goods. Slowdown sensors 171 can be angled upwards to detect the goods, rather than merely the pallet, in case there is any overhang. Cart 100 can also include upward looking sensors 172 to confirm that the pallet is correctly positioned over a pallet lifting platform 140 at the top of cart 100.

A side sensor 170, such as an optical sensor, is provided on one or both sides of cart 100 and is adapted to detect an indicator 175 on a side wall 177 of rail 120. Carts 100 can also include an internal motor for driving wheels 110 and a drive motor for lifting platform 140, electrical storage batteries. Operating electronics, a CPU, a memory, inputs and controls can also be included. Cart 100 can be constructed to receive and transmit WIFI signals and include RF controls and transmitters. The construction of such carts is known in the art.

Those of ordinary skill in the art will appreciate the various types of sensors and the electronics that can be used to pass information from the sensors to the cart CPU and from the CPU to the drive and lifting motors. Acceptable sensors are available from Banner Engineering, Inc. of Minneapolis, MN. Other acceptable sensors are available from Sick Inc., also of Minneapolis, MN. Pallet transportation cart 100 can advantageously include a Programmable Logic Controller (PLC).

Figure 8:
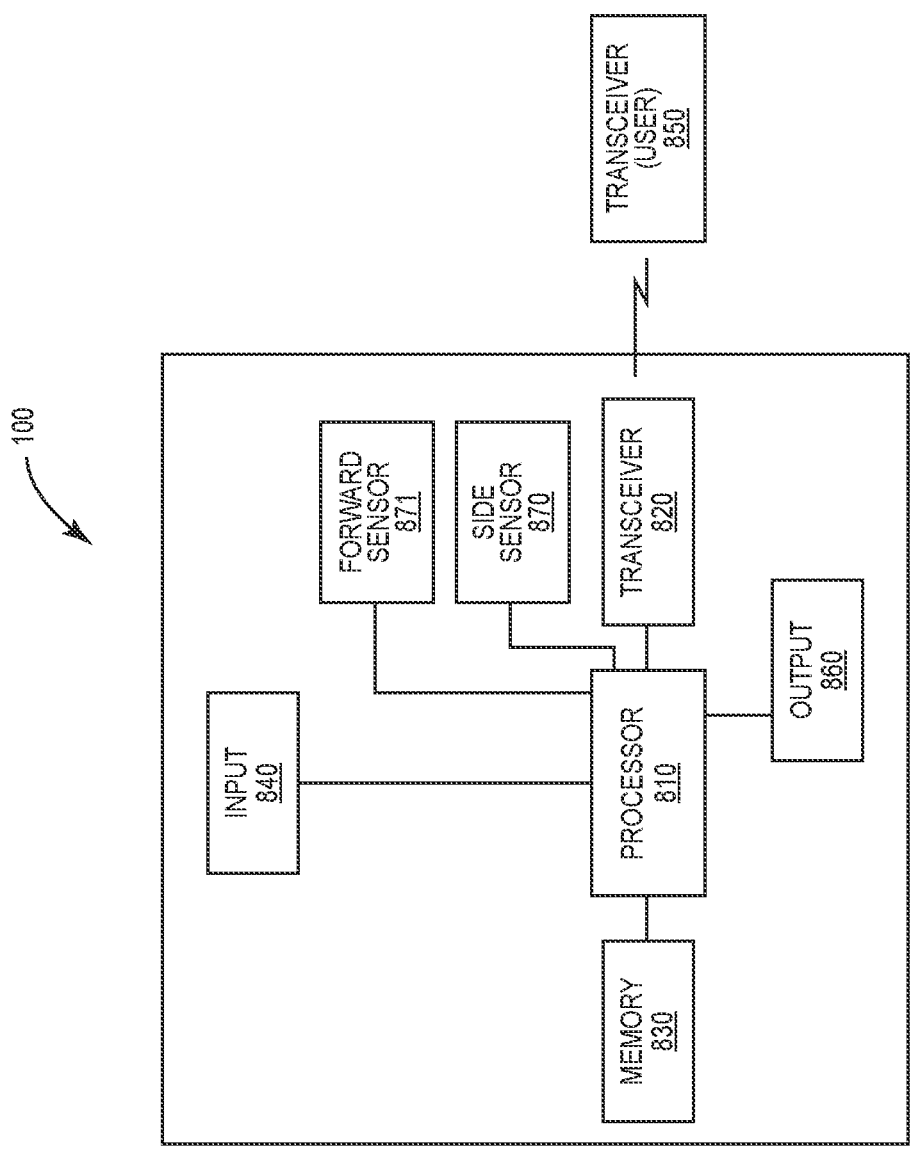
FIG. 8 is a schematic diagram of the electronics of the automated pallet transportation cart of FIG. 1.

Referring to FIG. 8, pallet transportation cart 100 includes a central processor 810, which can be electrically coupled to a forward-looking sensor 871 and a side looking sensor 870. Forward sensor 871 can be a motion sensor and be used to detect objects in the forward path of cart 100. Processor 810 can be programmed to slow cart 100 by detecting the cart as approaching a pallet.

Side sensor 870 can be an optical sensor and be used to detect indicators on the side rail, to indicate where to stop and lower the pallet. A transceiver 820 can be coupled to CPU 810 and can emit and/or receive an RF, Bluetooth or other signal to receive inputs regarding the transportation of pallets, inventory information and the like. This information is received by transceiver 820 and stored in a read/write or read only memory unit 830. Memory 830 can be a flash drive, a hard drive and other magnetic, optical or other storage media. In addition, various instructions and data can be programmed into processor 810, through an input 840. Input 840 can be a keyboard, push buttons, switches, a data port or a signal receiver and the like.

Instructions can also be transmitted to pallet transportation cart 100 by sending a signal from a user's transceiver 850. Information can be collected by sending an appropriate signal to cart transceiver 820 and reading information from memory 830. Alternatively, pallet transportation cart 100 can include an output 860 from which information can be read. Output 860 can be an LCD or LED display, lights, a counter wheel or a data port. Other hardware for inputting instructions to processor 810 will be evident to those of ordinary skill in the art. Control of the pallet transportation carts is generally with a handset controller or similar. In certain embodiments of the invention, such as when robotic forklifts are used, commands to the carts can come from AGV control software, which can run an entire "fleet" of AGV forklifts in one or more buildings. An interface to the AGV can be provided that allows them to send commands from their software, which mimic the commands coming from the handset controllers in these cases.

Pallet transportation cart 100 can include rechargeable batteries, preferably lithium batteries, a drive motor for cart wheels 110, and a lift motor for pallet lifting platform 140 used to raise and lower pallets of goods over cart 100. These can be controlled by the electronics discussed above and elsewhere herein.

Cart 100 should include forward looking sensor 171, which can function as a slow down sensor, to help determine when cart 100 should slow down, coupled to CPU 810. This helps cart 100 determine if it is approaching another pallet or object impeding its path on the rail, so that it can slow down and stop in time. Acceptable sensors include optical sensors shining a light and/or laser ahead. Other types of acceptable sensors include motion type sensors, such active ultrasonic and passive infrared (PIR) sensors. Microwave motion sensors emit microwave pulses. Much like an active ultrasonic sensor, the microwaves bounce off objects and return to the sensor.

Active ultrasonic sensors emit ultrasonic sound waves. These waves bounce off objects in the immediate vicinity and return to the motion sensor. A transducer acts as a waypoint for the signal. It sends the pulse and receives the echo. The sensor can determine the distance between itself and the target by measuring the time between sending and receiving the signal and transmits this information to the CPU. If the signal received is within specified parameters, the motion sensor will trigger, alerting the cart that someone or something is near the sensor and that it should slow or stop. In one embodiment of the invention, if a pallet ahead of the cart is detected within a specified distance, the cart will stop and lower the pallet at the location of the next side indicator 175 detected by side sensor 170. Cart 100 can be programmed to lower the pallet a specific distance with respect to the sensor.

Passive infrared sensors detect fluctuations in infrared energy. Infrared motion sensors detect the presence of a person or object by detecting the change in temperature ahead of the cart. There can be two sensors within a PIR camera. The PIR camera detects ambient IR. When the cart approaches an object, the first sensor intercepts the heat signature, causing the sensor to send a signal to the CPU to alert the cart that an object is approaching and that it needs to slow down or stop.

Cart 100 can include motion, optical or other sensors to determine when it is approaching a pallet 135 (or other object) already in place on support surface 125. Forward looking sensors 171 can advantageously be directed at an upward angle and sense the closest surface of goods 131 on pallet 135, so that cart 100 can slow its forward progress and lower the pallet onto support surface 125 when the next indicator 175 is sensed.

It can be inconvenient to arrange goods 131 on pallets 135 with precise and highly consistent dimensions. For example, goods 131 to be loaded into the bay 20 might differ from pallet to pallet and have slightly different dimensions from front-to-back. Moreover, even when the goods are identical, for example, cases of bottled water, even slight differences in the way the cases are secured to pallet 135 can lead to small differences in the front-two-back dimensions. In certain long deep storage systems, even these small differences can add up as the differences accumulate through multiple pallets. Therefore, in accordance with the invention, the pallets will be lowered onto storage surface 125 at a precise location along rail 120, so that the gaps between pallets of multiple levels are aligned, without regard for differences in pallet dimensions and to prevent the differences from compounding.

Figure 3:
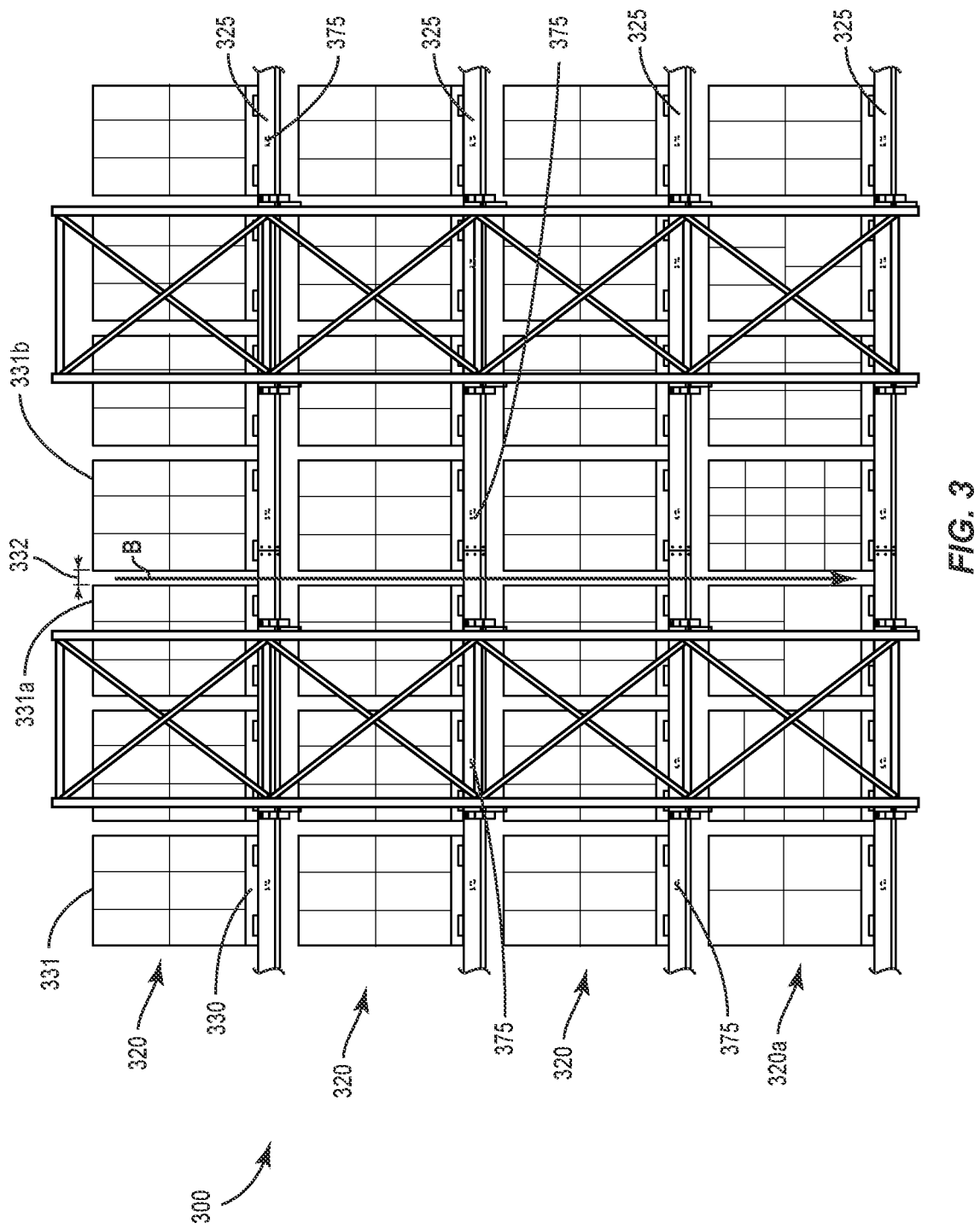
FIG. 3 is a side view of a multilevel commercial storage rack, in accordance with an embodiment of the invention.

FIG. 3 shows a portion of a deep rack storage system 300. Storage system 300 includes a plurality of storage bay levels 320 arranged vertically, one over the other. Each storage bay level 320 includes a plurality of pallets 330 of goods 331. These pallets can weigh up to 1000 lbs., over 2000 lbs., even over 3000 lbs. Therefore, any rails 325 supporting pallets 330 should be constructed of materials and configured to be able to support the appropriate load as required, whether up to 2000 lbs., 4000 lbs. or more.

For example, rails 325 that support the pallets 330 and carts can be made from steel of at least 16 gauge, preferably 16 to 7 gauge, or thicker. Steel at least $\frac{1}{16}$ thick, preferably $\frac{1}{16}$ to $\frac{3}{16}$ inch thick is preferred. An I-beam shape construction, preferably formed as roll formed steel is preferred, but angle steel constructions can be used for certain installations. The beam/rail construction should have a lower surface for the cart wheels of a pallet cart; and a an upper surface to be above the cart on which the pallets can be lowered. These side rails 325 and acceptable alternatives should have a side-wall or other suitable structure to support a plurality of position indicators 375, in accordance with the invention.

A columnar gap 332 exists between each pallet 330 of goods 331. This gap can be preset, prior to pallet loading.

The gap can be set at 2", 4", or even 6" and more, as desired. As can be seen in FIG. 3, the gaps 332 of one level are to be substantially vertically aligned with the gaps 332 of the level above or below, in a columnar fashion. For example, a direct line B extends down gap 332, between pallet of goods 331a and 331b all the way to the bottom or rack 300. Therefore, if a fire were to occur at a lower level 320a, heat and/or smoke can quickly make its way through the columnar gaps 332 and reach a fire detector positioned above rack 300. Also, if any sprinkler system located above rack 300 or other water flow system is activated, the water can more easily make its way to the bottom of rack 300 through columnar gaps 332.

One embodiment of the invention includes the following method of operating the pre-programmed, automated pallet transportation carts:

Load cart with pallet of goods at front position in storage bay;

Travel towards rear of storage bay with load at transport speed, while sensing forward whether the cart is approaching a pallet of goods;

If a pallet of goods is sensed, optionally slow to positioning speed and sense sideways for a positioning indicator;

When a positioning indicator is sensed, stop cart at the indicator or at a pre-determined distance from the indicator, deposit pallet on rack, and optionally return to front of bay.

In another embodiment of the invention, the cart can be programmed to carry out the following method, which does not require front sensing:

Load cart with pallet of goods at front position in storage bay;

Travel towards rear of storage bay with load at transport speed, while sensing sideways, counting and recording the number of side indicators sensed;

Optionally, when a preselected number of side indicators is sensed, slow the cart to deposit speed;

When a preselected number of side indicators is sensed, stop the cart, deposit the pallet of goods on the storage bay, and optionally reduce the preselected numbers by a predetermined amount, and return to the frontward position.

In another embodiment of the invention, the method is a combination of the above two methods, including counting the side indicators and sensing if the cart is approaching a pallet of goods in the storage bay. These methods can be repeated at different levels of a storage rack, so that gaps between the pallets of goods are vertically aligned from the top to the bottom of the rack.

Typically, the goods are loaded on a pallet to be at least flush with the outer dimensions of the pallet. Typically, the front and back overhang of goods 331 over the front and rear edges of pallet 330 is about 0". However, often, there is about a 0.5", 1", a 2" or other overhang. Therefore, if it can be desired to obtain a gap of at least e.g., about 6" between the entire loads of adjacent pallets. If some of the pallets have up to 2" overhang, then the gap needs to be set at about 6"+2"+2"=10 inches. Therefore, for certain storage situations, the gap between pallets should be about 7", 8", 9", 10" or wider. The spacing of the indicators is not likely to be required to be more than about 60 to 65, or 70 inches apart.

Pallets are often 48" from front to back. If there is essentially no overlap expected, then the pallets should be spaced at 48"+6"=54 inch intervals. If there is a potential front and rear overhang, then front plus rear overhang should be added to the pallet length to determine indicator spacing. The rearward most indicator should be positioned to include an appropriate distance from the end of the storage bay.

Figure 4:
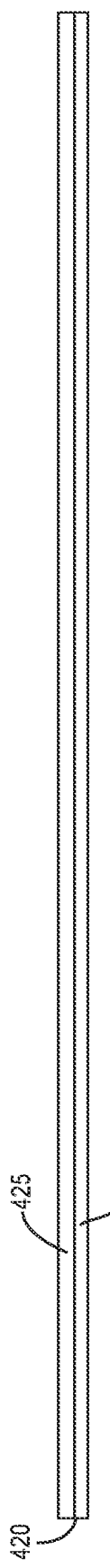
FIG. 4 is a top view of a rail for an automated pallet transportation cart, in accordance with an embodiment of the invention.

A pallet rail 420 in accordance with an embodiment of the invention is shown in FIG. 4. Pallet rail 420 is secured horizontally to vertical columns of a storage rack system. Pallet rail 420 includes a top surface 425, on which pallets of goods are to be placed. Pallet rail 420 also includes a cart wheel support surface 460. The wheels of a pallet transportation cart ride on cart wheel support surface 460.

Figure 5:
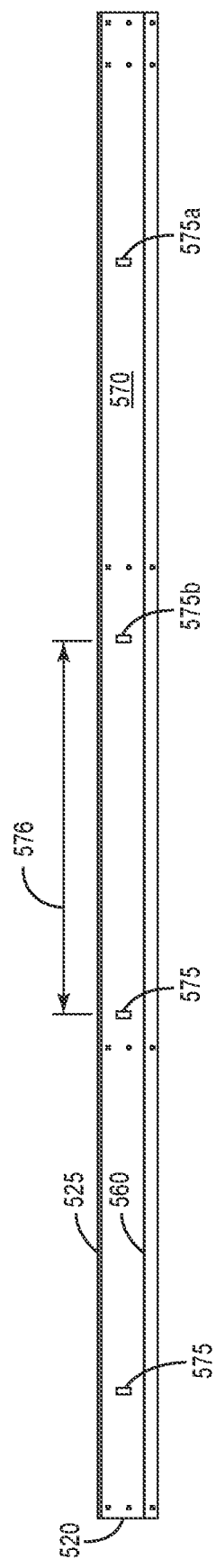
FIG. 5 is a side view of a rail for an automated pallet transportation cart, in accordance with an embodiment of the invention.

A pallet rail 520 in accordance with another embodiment of the invention is shown in FIG. 5. Pallet rail 520 includes a top surface 525 for supporting pallets and a cart support surface 560, for supporting the wheels of a pallet transportation cart. A vertical wall 570 extends from top 525 to cart support surface 560. Pallet rail 520 includes a plurality of reflector flags 575 as position indicators on vertical wall 570. An optical sensor system on the pallet transportation cart can include a light directed sideways from the pallet transportation cart. The sensor can detect the light reflected from flag 575, but not at other flag-less positions on rail 520.

The cart can be programmed to stop and lower the pallet it is carrying, either at or a selected distance from flag 575. Optionally, a first sensor can count detected flags 575 and slow the cart, and a second sensor can stop the cart at a second flag 575. In an embodiment of the invention, the cart counts flags 575 is it travels along rail 520 and is programmed to slow and/or stop at a selected flag number. This number is adjusted for the next cart.

For example, a pallet cart traveling to flag 575a will count 4 flags 575 as it travels down the storage bay. It will then return to the front of the bay. It can be programmed to subtract 1 from the number of flags 575 when it returns down the bay, such that it will count 3 flags 575 as it arrives at flag 575b and deposit the pallet.

In another embodiment of the invention, the cart will be programmed to count the number of flags on the return trip from depositing a pallet and stop at that number when it delivers the next pallet. In another embodiment of the invention, the cart detects that it is approaching a pallet and stops at the next detected flag. Those of ordinary skill in the art will understand various ways to program the cart so that it deposits the pallets with the spacing equal to the spacing between flags 575.

In another embodiment of the invention, the optical sensor can detect the presence of light reflected from rail 520 itself. Therefore, rather than using reflective flags 575, the flags absorb sufficient light, such that the absence of reflected light is the detected positioning indicator.

Flags 575 can be held in place on rail 520 by a permanent adhesive or a reusable adhesive. If a reusable adhesive is employed, the flags can be re-spaced as needed. Another alternative is to attach flags 575 to magnetic strips, which would allow for convenient repositioning of flags 575 as needed, should the effective pallet depth change or for other reasons. The spacing 576 between flags 575 should be the nominal pallet depth, plus a desired spacing between pallets.

In one embodiment of the invention, flags 575 have an area of at least 0.25 in$^2$ formed as 0.5" squares. Rectangular, circular and other shapes are acceptable, as long as they function properly with the side sensor. Preferably, the flags are formed as 1" side squares, or more, even 2" or 2.5" squares, having an area of about 4 or 6.25 in.$^2$. Flags 575 can be white, mirror finish, black (discussed below) or other finishes as desired, as long as they function with the sensor employed. Acceptable flags are often available from the manufacturer of the sensor to be used. For example, if a Banner Engineering sensor is to be used, acceptable indicator flags can typically be obtained from Banner.

Figure 6:
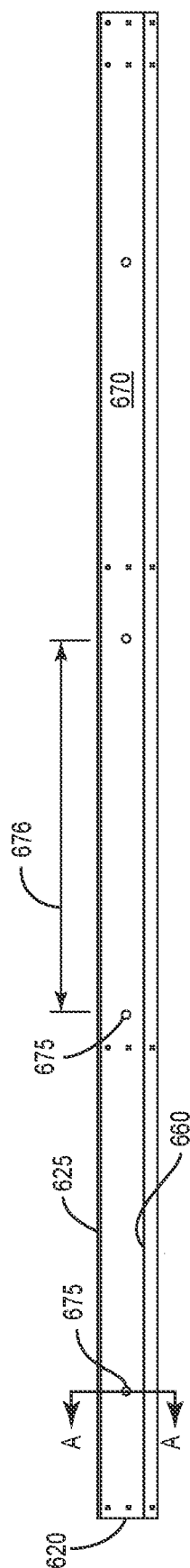
FIG. 6 is a side view of a rail for an automated pallet transportation cart, in accordance with another embodiment of the invention.
Figure 7:
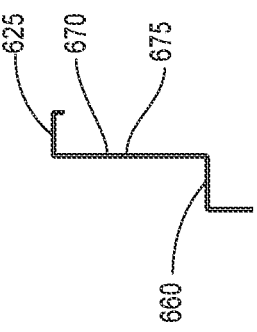
FIG. 7 is a cross-sectional view of the rail for an automated pallet transportation cart of FIG. 6, taken along line AA.

A pallet rail 620 in accordance with another embodiment of the invention is shown in FIG. 6. A cross sectional view is shown in FIG. 7. Pallet rail 620 includes a top surface 625 for supporting pallets and a cart support surface 660, for supporting the wheels of a pallet transportation cart. A vertical side wall 670 extends from top 625 to cart support surface 660. Pallet rail 620 includes a plurality of holes 675 formed through vertical wall 670. An optical sensor system can include a light directed sideways from a pallet transportation cart. The sensor can detect the light reflected from vertical side wall 670. However, it detects that no light is reflected from hole 675. Therefore, hole 675 functions as the position indicator. Otherwise, the system operates similar to a system using flags 575. While holes 675 cannot be as easily re-arranged as flags 575, there is a chance that flag 575 can come off rail 520. This cannot occur with hole 675. For applications where the pallet depth will remain fixed throughout the life of the storage system, a methodology based on hole indicators may also have some cost advantages as these holes can be created at the time the parts are manufactured.

The holes should have a diameter of at least ¼ inch, preferably, ½ inch. 1" and even 1.5" holes can be acceptable. The size of the holes depends on the sensor, the speed of the cart, and the height of the rail. It will be apparent to those of ordinary skill in the art that a large hole cannot be formed through a short rail, or the rail will become too weak.

In one embodiment of the invention, the rail for supporting the pallets and the pallet cart includes at least 5, preferably at least 10, more preferably at least 20 pallet spacing indicators. The bays are stacked at least 3 bays high, preferably at least 5 bays high.

The distance between pallet spacing indicators should be at least 2", preferably at least 6" more than the length of the pallets to be stored in a row. In one embodiment of the invention, the distance between pallet spacing indicators should be over about 48", preferably over 54", even over 56".

In another embodiment of the invention, the indicators are located at selected intervals along the side rails. For example, the indicators can be located every inch or every 2 inches in a row. The indicator where the first pallet is lowered can be, e.g., 1920 inched-spaced indicators from the front of the row. The pallet cart can be programmed to count the indicators as it travels from the front to the rear of the row. In an example where the indicators are spaced every inch, the pallets are 48" long, many of the pallets have up to 1" overhang and the spacing is desired to by 6", the total spacing between pallets should be 48+1+1+6=56". Therefore, the cart should be programmed to count 1920–56=1864 indicators and lower the second pallet. At 1808 indicators, it will lower the third pallet, and so forth. In this embodiment, it can be important that the physical rail indicators are used to denote pallet "drop" locations, as opposed to other methodologies such as various sensors or indicators that may count "wheel" or drivetrain revolutions. Such internal sensors or counts can vary slightly each time a unit is placed into a lane, resulting in the variances in vertical alignment of pallet gaps as previously described. However, consistent markings on each level of storage, in accordance with the invention will provide the desired consistency of pallet gaps as described in the embodiment of the invention.

EXAMPLES

The following examples are for illustration only and are not to be interpreted as limiting.

Sequence of Operation—Pallet Cart Deposit and Auto Deposit Operation

A pallet transportation cart in accordance with an embodiment of the invention can be programmed to operate as follows, with, e.g., the following pre-programmed routines, which can be written in the code of the Programmable Logic Controller PLC "brain" on each unit, which handles placing pallets into storage on the deep storage bay or deep lane system. A "DEPOSIT" request activates this routine for a single pallet, and an "AUTO-DEPOSIT" request activates this for a larger but unspecified number of pallets (i.e. —the unit will continue until lane is full). A description of the sequence of events that happens during these routines is as follows:

Deposit Sequence:

A pallet cart unit begins the sequence in the "HOME" position—with the face of the cart approximately 1 foot into the storage lane rails (from aisle face).

An operator requests a DEPOSIT function—to place a SINGLE pallet into the storage lane.

The pallet is placed in the aisle position on the storage lane—with the entire pallet slightly inside the face of the racking system (outside edge of pallets is typically placed about 1"-2" inside the racking—just behind the end of the lane plates).

When the pallet is placed into the system—it will cover one of the two "Pallet in Place" sensors which are located on the top of the cart and which are aimed directly up. The Pallet in Place sensor closest to the front of the cart is covered in this step—which informs the cart that a pallet is waiting to be picked up for storage.

After an optional short delay (the delay is adjustable in the PLC program—and is designed to allow the operator time to make any small adjustments to the position of the of the pallet)—the cart, carrying the pallet moves forward to align the deck lid with the load to be stored. On a 48" deep load, with a standard 48" deep deck lid cart, BOTH "Pallet In Place" sensors will be covered at the point where the cart deck is properly aligned—front to rear—with the depth of the pallet. (There are some special circumstances, such as handling pallets that are not 48" deep—either shorter or longer—where additional steps are needed and where alignment can be with the REAR of the pallet with the REAR of the deck lid.

Once the Pallet is properly aligned (in depth perspective) with the deck lid, the cart deck lid is raised (up to 2" of travel)—this lifts the pallet slightly above the storage rail and allows free movement of the pallet into the system.

The cart accelerates into the deep lane storage rail system, reaching full speed within several feet, (assuming the distance to be covered is at least several pallet positions).

Once the cart and load are traveling at high speed, the next step will depend on whether this is the FIRST pallet being stored on an empty lane, or whether there are already pallets in storage, and the pallet being moved will be the next one stored in sequence.

For an EMPTY lane, the cart will continue towards the opposite end of the storage lane, until it approaches the opposite end of the rail, at which point the encoder bearing is used to trigger a slowdown so that the cart approaches the rail end at slow speed. This is done to insure that the cart approaches the rail end at slow speed. With the EMPTY lane condition (1$^{st}$ pallet stored)—the cart will place the load being stored just inside the system at the opposite end.

For subsequent pallets being placed into the system—the spacing of the loads is done with a combination of sensors. The "Slowdown" sensor scans the area ahead of the cart, looking for a pallet already stored on the storage lane. When this pallet is detected, the slowdown is activated, reducing travel speed from hi speed (typically 180 fpm loaded—can vary depending on a few factors and may travel faster in certain applications). In slow speed operation, the cart is traveling well below 1 mph or around 21 fpm). Once the cart is in slow speed, it is looking for further input.

At this stage in the DEPOSIT function, with the unit in slow speed, (initially triggered by the SLOWDOWN sensor). A forward looking Pallet Spacing sensor "may" also be used here—to insure that the pallet is within a certain range of distance the final stopping point—BEFORE the additional side looking sensor is used to "find" the rail indicator marking that will dictate the actual stopping point. With a rail marked with a "stopping point" for every pallet position—it can be insured that each pallet is within a short distance of the stored pallet being approached—before the FINAL stopping action is triggered, otherwise one might inadvertently stop at the wrong fixed marked location. Depending on the weight of the pallet being moved, and the speed of the unit—it may be helpful to use a combination of a forward looking slowdown sensor and a forward looking Pallet Spacing sensor, to help put the cart in the "final approach" mode—where it is now "looking" sideways for the rail indicator marking to trigger the stopping function. With lighter pallets and slower speeds—the slowdown sensor alone could be used without the forward looking Pallet Spacing sensor.

By tying the final stopping point to fixed rail markings—it can be insured that pallets on every level are aligned. This also aligns the gaps between the pallets as desired by e.g., fire protection engineers and insurance carriers for optimum performance of the fire protection system.

Once the fixed marking sensors have triggered the PLC to stop, the cart will lower the pallet down onto the storage level of the rail system, with the deck continuing down to its lowest position (deck lowers approximately 1" below the storage rail level to accommodate pallet deflection, etc.)

When the load is placed and the deck is fully lowered, the cart returns to the original front end of the bay lane at high speed.

When cart approaches the "HOME position)—the encoder bearing count will trigger a slowdown to slow speed, with the cart returning to the original starting point. (a reflective flag on the rail ends can act as insurance against an encoder error.

For the DEPOSIT function—the routine is now COMPLETED—and the cart will remain in the HOME position awaiting the next command.

Auto-Deposit Sequence:

For the AUTO-DEPOSIT routine—the sequence acts exactly as described above in the DEPOSIT routine, with the exception that:

"For the AUTO-DEPOSIT function, the deposit of the pallet is COMPLETED and the cart will return to the HOME position. As soon as the next pallet is placed—the full sequence is re-started, beginning with the Pallet in Place sensor being triggered as described above.

Note that where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claims.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A method of stacking a plurality of pallets of goods in a multi-level commercial storage rack having an upper level storage bay directly above a lower level storage bay, wherein:

an upper level support structure and a lower level support structure extend within the upper level storage bay and the lower level storage bay, respectively, the upper and lower level support structures adapted to support the pallets and to support at least one automated pallet transportation cart, the upper and lower level support structures having a side surface facing inward into the upper level and lower level storage bays;

the upper and lower level storage bays each comprising an arrangement of a plurality of position indicators at selected locations within the upper and lower level storage bays, the position indicators adapted to function with a position indicator sensor, the position indicators arranged to indicate the location where the cart deposits the pallets on the upper and lower level support structures;

the method comprising transporting the plurality of pallets of goods with the automated pallet transportation cart on the respective upper and lower level support structures, the cart depositing the plurality of pallets of goods on the respective upper and lower level support structures based on the location of the position indicators, the pallets deposited on the respective upper and lower level support structures with gaps of at least two inches between adjacent pallets, and each of the gaps between the pallets on the upper level support structure are substantially vertically aligned above the gaps between adjacent pallets on the lower level support structure.

2. The method of claim 1, wherein the pallets are spaced with said gaps being at least 4 inches wide.

3. The method of claim 1, wherein the pallets are spaced with said gaps being at least 6 inches wide.

4. The method of claim 1, wherein the position indicators are reflective position indicators and reflect a selected amount of light emitted by the position indicator sensor, back to the position indicator sensor.

5. The method of claim 4, wherein the position indicators are rectangularly shaped.

6. The method of claim 1, wherein the position indicators are light absorbing position indicators and prevent a selected amount of light emitted by the position indicator sensor from being reflected back to the position indicator sensor.

7. The method of claim 6, wherein the position indicators are rectangularly shaped.

8. The method of claim 1, wherein the position indicators are rectangular mirror finish flags located on the side surface.

9. The method of claim 1, wherein the position indicators are removably adhered to a first selected location on the side surface with removable adhesive, or a magnetic device, and are then removed and repositioned to a second selected location on the side surface.

10. The method of claim 1, wherein the position indicators are holes formed through the side surface.

11. The method of claim 1, wherein the position indicators are rectangular holes formed through the side surface.

12. The method of claim 1, wherein the position indicators are rectangular and have an area of at least about 0.25 in$^2$.

13. The method of claim 1, wherein the position indicators are rectangular and have an area of at least about 1 in$^2$.

14. The method of claim 1, wherein the position indicators are positioned at least 48 inches apart on the side surface.

15. The method of claim 1, wherein the pallet transportation cart comprises a controller, a drive motor operatively coupled to the controller and the wheels, and the position indicator sensor is operatively coupled to the controller and the drive motor, and the controller senses the location of a selected position indicator and deposits the pallet based on the location of the selected position indicator.

16. The method of claim 1, wherein the storage rack is constructed of materials and adapted to hold at least 10 pallets, each weighing at least 1000 pounds.

17. A method of stacking pallets of goods in a multi-level commercial storage rack, having at least a first upper level horizontal storage bay directly above a second lower level horizontal storage bay, comprising:
    transporting a plurality of first upper pallets of goods on at least one automated pallet transportation cart from a front of the upper level storage bay towards a rear of the upper level storage bay on a horizontal upper level rail structure having a pallet support surface for supporting a plurality of pallets, a cart support surface for supporting at least one pallet transportation cart and a side surface facing into the bay, the upper level storage bay comprising a horizontally extending arrangement of a plurality of position indicators at selected locations thereon and the at least one cart depositing the upper level pallets on the upper level rail structure with gaps of at least 2 inches therebetween;
    transporting a plurality of second lower level pallets of goods on an automated pallet transportation cart from a front of the lower level storage bay towards a rear of the lower level storage bay on a horizontal rail structure having a pallet support surface for supporting a plurality of pallets, a cart support surface for supporting the at least one pallet transportation cart and a side surface facing into the bay, the lower level storage bay comprising a horizontally extending arrangement of a plurality of position indicators at selected locations thereon and the cart depositing the lower level pallets on the lower level rail structure with gaps of at least 2 inches therebetween; and
    based on the location of the position indicators, depositing the upper level pallets and lower level pallets such that the gaps between the upper level pallets are vertically aligned with the gaps between the lower level pallets.

18. The method of claim 17, wherein the gaps are at least 4 inches wide.

19. The method of claim 17, wherein the pallet transportation cart senses the location of the position indicators with an optical sensor.

20. The method of claim 17, wherein the at least one pallet transportation cart travels along a length of the storage bay, raises and lowers pallets of goods weighing over 2000 pounds onto and off of the rail structure, senses the location of the position indicators, and deposits the pallets at selected locations based on the sensed location of the position indicators.

21. The method of claim 17, wherein the cart senses that it is approaching an object in the path of the cart as it travels in the bay and slows down when sensing an object in in the path of the cart.

22. The method of claim 17, wherein the first upper level bay and second lower level bay are at least 10 pallets deep.

23. A method of positioning pallets of goods in a commercial storage rack, comprising:
    transporting a first pallet of goods from a first end towards a second end of a storage bay the rack with at least one automated pallet transportation cart;
    depositing the pallet from the cart into the bay;
    transporting a second pallet of goods from the first end towards the second end of the bay with the at least one automated pallet transportation cart;
    depositing the second pallet of goods into bay from the at least one automated pallet transportation cart at a bay location based on the sensed location of at least one position indicator within the bay, the second pallet of goods deposited towards the first end of the bay with respect to the first pallet of goods, with a first gap of a selected width of at least 6 inches between the first and second pallets of goods; and
    depositing a third pallet of goods into the bay from the at least one automated pallet transportation cart based on the sensed location of one of the position indicators within the bay, the third pallet of goods deposited towards the first end of the bay with respect to the second pallet of goods, with a second gap of the selected width between the second and third pallets of goods.

* * * * *